9255X
E. Johnson.
Railroad Track.
Patented Nov. 23, 1835.
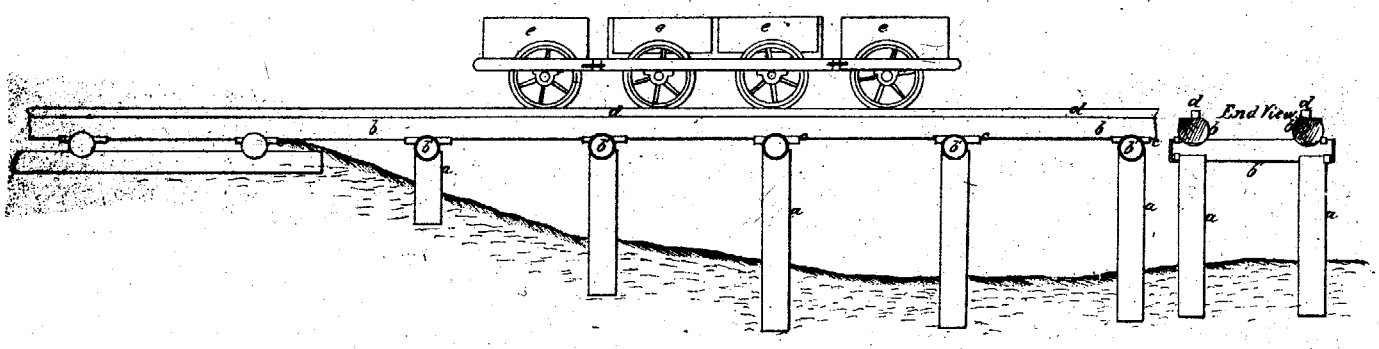

Elisha Johnson, of Rochester, New York.

Letters Patent.

The Schedule referred to in these Letters Patent & making
part of the same containing a description in the words of the said Elisha
Johnson himself, of his improvement in the construction of Rail Roads.

Be it known that I Elisha Johnson of the City of Rochester County of Monroe
and State of New York, have invented new and useful improvements in the
Construction of Rail Roads, and that the following is a full and exact
description of the materials, machinery, form of Construction and the mode
of executing the work. First. A timber work of the description represented
in Fig 1. prepared and put up in such parts of the line of Rail Road as
required embanking a.a.a, blocks of round timber sawed with square
ends of any diameter, the most suitable size is 18 inches placed in
firm earth by excavating pits or shafts through the roots & vegitable
soil and of a proper length to suit the grade line and placed ten feet
from centre to centre, in two lines under the line of railing. On
these are placed round cross timbers of any size (those of 12 inches
diameter and nine feet in length the most suitable) these are spotted
and fitted to the blocks, places are prepared in the cross timbers 12
to 15 inches in width over the blocks to receive the sleepers marked
on plan b.b.b. – The longitudinal sills or sleepers to be round timber
not less than one foot in diameter at the small end, to be well hewed on
the upper side squared at the end, and at each ten feet, and the same
placed on the cross timbers and secured by keys marked on plan
c.c. where the surface is near grade the cross timbers are placed on
blocks placed horizontally or laid in trenches. in this form all of
the line may be timbered excepting the cuttings. This preperation of
timber work is made in timbered land while clearing and slashing
the line using any description of timber for blocks and cross timbers
and for the cuttings select descriptions for durability in the
vicinity Drawing ann'd V

9255X vicinity of the line, and sufficiently straight to admit of the [illegible]
[illegible] surface and to admit the line of track within the flat sur-
face, the roughest description of timber answers for the frame
and is more secure in the grade; where the surface is near the
grade line the timber is grubbed and the surface [illegible] other
parts of the line where there are embankments, to stumps are
cutt low, and timber moved off, otherwise the surface is left
in its natural state — On the flat surface of the longitudinal timbers
are placed rails of hard timber 2 by 4 inches or of any other size tem-
porarily spiked on — on this timber work is placed four six or eight
The wheels and seats of the description used for freight cars
wheeled cars, and designed as a part of the permanent Machinery
of the rail road and of the form in common use, The arrangement
of the frame and earth boxes are of a new and particular form
of construction and adapted to the purpose of completing the
excavations and embankments as the work progresses. The cars
at short distances are moved by the labourers and greater by
Horse power. The eight wheel_d cars are represented by Fig 2 and
have a centre frame and 4 wheels with two boxes 4 by 6 feet and two
feet in height hung by hinges or [illegible] in the centre of the side pieces
of the frame and are dumped on the outside of the track and constructed
of 1¼ and 2 inch plank secured by cleets at the bottom and dovetailed
at one end and open at the other and otherwise secured by spikes —
At each end of the centre frame is a square frame with one pair of wheels
secured to the centre frame, by clasps, staples and keys and when
dumped, balances on the axle of the wheels at the pivots and dis-
charges between the rails. The box is secured to the frame between
the wheels. The six wheeled cars have but one end frame and a [illegible]
small end box hung by hinges to the end piece of the centre frame before des-
cribed. The four wheeled cars consist only of the centre frame in the form
above described and four boxes of 4 by 4 feet and 2 feet in height secured to the side
and end pieces by hinges dumping in the side and centre of track, and better adapt-
ed to light cuttings and embankments. The cars enter the cutting from one to two
hundred feet upon scantling placed upon the line of grades. The bar is then
moved

9255X removed and the permanent timber work put down and again progress
is as before completing the road as the cuttings progress. The road
when any part is completed is used for the removal of materials and
for the transportation of goods persons or property until the embank
-ments are permanent by use and age at which time the temporary
rails ribbons or scantling are taken up the timber adjusted (if
settled at any point the grade particularly prepared, examined,
and new dressed, and the masonary examined or built if tem=
porarily passed over to favor the transportation of the materials
by the line of road. New rails are then put down with care, the
iron put on with spike passing through the rails into the longitu=
dinal sills or sleepers, and provision made for passing of the
water from the centre of the track at the meeting of the rails, which
are proposed to be three by four and a half or five inches of the
most suitable timber that can be obtained. The grade to cover
one and a half inches over the sleepers or longitudinal sills thereby
covering within the grade the whole line of timber work except a
part of the rail on which the iron rests and thereby favour=
ing the durability of the timber work. The advantages proposed
in the above plan of road cars and mode of construction and
executing the work is the improvement claimed and described as follows
First. The application of such timbers as is near or in the line of
road and in its rough form, and of any length at small expense,
Secondly. The use of such timber work for the purpose of grading
and the removal of other materials for the construction of the
road, and of persons and property in such parts of the line
as is completed upon wood (or iron temperarily put on) while the
embankments are perfecting, completing the embankments, and
cuttings at one third to one half of the expense of any other known
mode. Thirdly. Applicable to extending a line of road into, and through
swamp districts, rocky or woody or prairies where timber has to be removed
for the road at great distances as well as earth for embankments.
Fourthly. The plan proposes that all the timber work (excepting

9255X the ribbons on which the iron lays) be within, and covered
by the grade and protected in its durability and providing
for a continuous bearing of the rail on which the iron lies,
removing the difficulty incident to wood roads for locomotive
power, and heavy trains, accidents to the machinery prevented by its
coming in contact with the up timbers when thrown from the track,
with many other advantages in detail not necessary to enu-
merate. Fifthly.— A change can be effected in the operative part of
constructing a road in the mode proposed; The labour would be controled and
managed by the agent of the company without contractors and the evils incident
thereto by employing practicable superintendants (working men) and small par-
ties employed by them in using the cars and constructing other parts of the work
with weekly work lists. the progress of construction being similar to working the
road after constructed, and similar agencies and means employed and all
of the economy, of rail roads in the transportation of property applied
in the removal of the great amount of tonage required in grading &
constructions of the masonary and wood work. the saving of labourers
and nine tenths of the team work, and avoiding the difficulties
incident to the increased demand of labour. Team work in
Quantities and forage are important to the interests of a company
and the progress of internal improvement, and is particularly appli-
cable to new districts of country in the progress of settlement and
where limitated investments of Capital would be necessary.
in comparing this plan with other modes of construction or in
and the improvement [illegible]
describing other modes to distinguish the mode proposed, First
that all known modes of construction contemplates first grading
of the line by contracts or days work by the use of Carts teams or
wheel-barrows and in some cases temporary ways with a train of
temporary earth cars passing on the side of earth banks and line
given to a line graded to perfect the banks after which commences
(and generally the following season) the construction of other parts
of a rail road occupying two to three years for the energy grading
and road track without any use of the road or benefit from
the the yearly investments. Secondly. That in the construction of wood
roads a superstructure is formed upon the grade with cross timbers
from three to five feet apart on which rests the rail secured by keys
or wedges leaving no support to the rail between the cross timbers.
The ends of the cross timbers and rail ~~[illegible]~~ being above the grade.
This form is the ~~modern~~ common use with variations adopting similar
principles and the use of small light timber sawed and in other known
modes larger hewed timber for rails has been substituted with more
substantial cross timbers. Remark. The Tonawanda Rail Road now
commencing at City of Rochester. State of New York is now constructing
on the plan on which I claim my improvement and is under my direction
as chief Engineer and is the first road known to have been built or
building on any similar plan to which reference is had to my
proposed improvement.

Elisha Johnson

William Wallace
Witnesses
William Fitch

Eng
W.G.

Drawing made

1728 Words]